United States Patent
Cho et al.

(10) Patent No.: US 10,769,837 B2
(45) Date of Patent: Sep. 8, 2020

(54) APPARATUS AND METHOD FOR PERFORMING TILE-BASED RENDERING USING PREFETCHED GRAPHICS DATA

(71) Applicant: SAMSUNG ELECTRONICS CO., LTD., Suwon-si, Gyeonggi-Do (KR)

(72) Inventors: Yeon-Gon Cho, Hwaseong-si (KR); Woong Seo, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/111,608

(22) Filed: Aug. 24, 2018

(65) Prior Publication Data

US 2019/0197760 A1 Jun. 27, 2019

(30) Foreign Application Priority Data

Dec. 26, 2017 (KR) .......................... 10-2017-0179801

(51) Int. Cl.
  *G06T 15/00* (2011.01)
  *G06T 15/04* (2011.01)
(52) U.S. Cl.
  CPC ............ *G06T 15/005* (2013.01); *G06T 15/04* (2013.01)
(58) Field of Classification Search
  CPC .................................................. G06T 15/005
  See application file for complete search history.

(56) References Cited

U.S. PATENT DOCUMENTS

| 5,534,844 | A | * | 7/1996 | Norris | ..................... | G06F 7/026 |
| | | | | | | 340/146.2 |
| 6,347,344 | B1 | * | 2/2002 | Baker | ................... | G06F 13/102 |
| | | | | | | 345/501 |
| 6,697,063 | B1 | | 2/2004 | Zhu | | |
| 7,158,682 | B2 | | 1/2007 | Sano | | |
| 7,710,424 | B1 | | 5/2010 | Hutchins et al. | | |
| 9,305,324 | B2 | | 4/2016 | McGuire et al. | | |
| 9,459,869 | B2 | | 10/2016 | Olson et al. | | |
| 9,640,131 | B2 | | 5/2017 | Croxford | | |
| 9,652,233 | B2 | | 5/2017 | Potter et al. | | |
| 9,703,642 | B2 | | 7/2017 | Aronovich | | |
| 9,978,118 | B1 | * | 5/2018 | Ozguner | ............... | G06T 19/006 |
| 2008/0276067 | A1 | | 11/2008 | Chen et al. | | |

(Continued)

FOREIGN PATENT DOCUMENTS

CN   103902502   1/2017

*Primary Examiner* — Daniel F Hajnik
(74) *Attorney, Agent, or Firm* — F. Chau & Associates, LLC

(57) ABSTRACT

A graphics processing unit (GPU), configured to perform tile-based rendering using prefetched graphics data, includes a tiler configured to perform binning on a current frame and obtain a first binning bitstream of a first tile among a plurality of tiles of the current frame, a binning correlator configured to determine whether the first tile and a second tile of a previous frame are similar to each other by using the first binning bitstream and a second binning bitstream of the second tile, where the second tile has a same tile ID as the first tile, a prefetcher configured to prefetch second graphics data used to render the second tile by using the tile ID, when it is determined that the first tile and the second tile are similar to each other, and at least one processor configured to render the current frame using the prefetched second graphics data.

18 Claims, 10 Drawing Sheets

(56) References Cited

U.S. PATENT DOCUMENTS

| | | |
|---|---|---|
| 2010/0153934 A1 | 6/2010 | Lachner |
| 2011/0080419 A1 | 4/2011 | Croxford et al. |
| 2013/0332937 A1 | 12/2013 | Gaster et al. |
| 2014/0373032 A1 | 12/2014 | Merry et al. |
| 2015/0221063 A1 | 8/2015 | Kim et al. |
| 2015/0378920 A1 | 12/2015 | Gierach et al. |
| 2016/0055610 A1 | 2/2016 | Kenney et al. |
| 2016/0163014 A1* | 6/2016 | Yang .................. G06T 11/40 345/502 |
| 2017/0353576 A1* | 12/2017 | Guim Bernat ...... G06F 12/0862 |

* cited by examiner

FIG. 4

|  | N-1 Frame | | | N Frame | | | Correlation |
|---|---|---|---|---|---|---|---|
|  | P0 | P1 | sum | P0 | P1 | sum |  |
| Tile 0 | 1 | 0 | 1 | 1 | 0 | 1 | O |
| Tile 1 | 1 | 0 | 1 | 1 | 0 | 1 | O |
| Tile 2 | 1 | 0 | 1 | 1 | 0 | 1 | O |
| Tile 3 | 0 | 0 | 0 | 0 | 0 | 0 | O |
| Tile 4 | 0 | 0 | 0 | 0 | 0 | 0 | O |
| Tile 5 | 1 | 0 | 1 | 1 | 0 | 1 | O |
| Tile 6 | 1 | 0 | 1 | 1 | 0 | 1 | O |
| Tile 7 | 1 | 0 | 1 | 1 | 0 | 1 | O |
| Tile 8 | 0 | 0 | 0 | 0 | 1 | 1 | X |
| Tile 9 | 0 | 0 | 0 | 0 | 1 | 1 | X |
| Tile 10 | 0 | 0 | 0 | 0 | 0 | 0 | O |
| Tile 11 | 0 | 0 | 0 | 0 | 0 | 0 | O |
| Tile 12 | 0 | 1 | 1 | 0 | 0 | 0 | X |
| Tile 13 | 0 | 1 | 1 | 0 | 1 | 1 | O |
| Tile 14 | 0 | 0 | 0 | 0 | 1 | 1 | X |
| Tile 15 | 0 | 0 | 0 | 0 | 0 | 0 | O |
| Tile 16 | 0 | 0 | 0 | 0 | 0 | 0 | O |
| Tile 17 | 0 | 1 | 1 | 0 | 0 | 0 | X |
| Tile 18 | 0 | 1 | 1 | 0 | 0 | 0 | X |
| Tile 19 | 0 | 0 | 0 | 0 | 0 | 0 | O |

FIG. 7

| ORDER | REQUESTED ADDRESS | HISTORY ADDRESS #1 – FIRST | HISTORY ADDRESS #1 – LAST | HISTORY ADDRESS #1 – SIZE |
|---|---|---|---|---|
| 1 | 0x0800_0030 | 0x0800_0030 | 0x0800_0030 | |
| 2 | 0x0800_0060 | 0x0800_0030 | 0x0800_0060 | |
| 3 | 0x0800_0020 | 0x0800_0020 | 0x0800_0060 | |
| 4 | 0x0800_0010 | 0x0800_0010 | 0x0800_0060 | |
| 5 | 0x0800_0040 | 0x0800_0010 | 0x0800_0060 | |
| 6 | 0x0800_0000 | 0x0800_0000 | 0x0800_0060 | |
| 7 | 0x0800_0050 | 0x0800_0000 | 0x0800_0060 | |
| 8 | 0x0800_00d0 | 0x0800_0000 | 0x0800_00d0 | |
| 9 | 0x0800_0080 | 0x0800_0000 | 0x0800_00d0 | |
| 10 | 0x0800_00a0 | 0x0800_0000 | 0x0800_00d0 | |
| 11 | 0x0800_0070 | 0x0800_0000 | 0x0800_00d0 | |
| 12 | 0x0800_0090 | 0x0800_0000 | 0x0800_00d0 | |
| 13 | 0x0800_00c0 | 0x0800_0000 | 0x0800_00d0 | |
| 14 | 0x0800_00b0 | 0x0800_0000 | 0x0800_00d0 | |
| 15 | 0x0800_0100 | 0x0800_0000 | 0x0800_0100 | |
| 16 | 0x0800_0120 | 0x0800_0000 | 0x0800_0120 | |
| 17 | 0x0800_00d0 | 0x0800_0000 | 0x0800_0120 | |
| 18 | 0x0800_00f0 | 0x0800_0000 | 0x0800_0120 | |
| 19 | 0x0800_0110 | 0x0800_0000 | 0x0800_0120 | |
| 20 | 0x0800_0190 | 0x0800_0000 | 0x0800_0190 | |
| 21 | 0x0800_0140 | 0x0800_0000 | 0x0800_0190 | |
| 22 | 0x0800_0160 | 0x0800_0000 | 0x0800_0190 | |
| 23 | 0x0800_0130 | 0x0800_0000 | 0x0800_0190 | |
| 24 | 0x0800_0180 | 0x0800_0000 | 0x0800_0190 | |
| 25 | 0x0800_0150 | 0x0800_0000 | 0x0800_0190 | |
| 26 | 0x0800_0170 | 0x0800_0000 | 0x0800_0190 | |
| 27 | 0x0800_01b0 | 0x0800_0000 | 0x0800_01b0 | |
| 28 | 0x0800_01a0 | 0x0800_0000 | 0x0800_01b0 | 0x0000_01b0 | ized

APPARATUS AND METHOD FOR PERFORMING TILE-BASED RENDERING USING PREFETCHED GRAPHICS DATA

CROSS-REFERENCE TO RELATED APPLICATION

This application claims priority under 35 U.S.C. § 119 to Korean Patent Application No. 10-2017-0179801, filed on Dec. 26, 2017 in the Korean Intellectual Property Office, the disclosure of which is incorporated by reference herein in its entirety.

TECHNICAL FIELD

Exemplary embodiments of the inventive concept relate to an apparatus and method for performing tile-based rendering, and more particularly, to an apparatus and method for effectively performing tile-based rendering using prefetched graphics data.

DISCUSSION OF RELATED ART 3-dimensional (3D) graphics application program interface (API) standards include open graphics library (OpenGL), openGL for embedded systems (OpenGL ES), Direct 3, or the like. API standards include methods of performing rendering on each frame and displaying images. When rendering is performed on each frame, numerous computations may be performed, and a large amount of power may be consumed.

SUMMARY

According to an exemplary embodiment of the inventive concept, a graphics processing unit (GPU), configured to perform tile-based rendering using prefetched graphics data, includes a tiler configured to perform binning on a current frame and obtain a first binning bitstream of a first tile among a plurality of tiles of the current frame, a binning correlator configured to determine whether the first tile and a second tile of a previous frame are similar to each other by using the first binning bitstream and a second binning bitstream of the second tile, where the second tile has a same tile ID as the first tile, a prefetcher configured to prefetch second graphics data used to render the second tile by using the tile ID, when it is determined that the first tile and the second tile are similar to each other, and at least one processor configured to render the current frame by using the prefetched second graphics data.

According to an exemplary embodiment of the inventive concept, in a method of performing tile-based rendering using prefetched graphics data in a graphics processing unit (GPU), the method includes performing binning on a current frame and obtaining a first binning bitstream of a first tile among a plurality of tiles of the current frame, determining whether the first tile and a second tile of a previous frame are similar to each other by using the first binning bitstream and a second binning bitstream of the second tile, where the second tile has a same tile ID as the first tile, prefetching second graphics data used to render the second tile by using the tile ID when it is determined that the first tile and the second tile are similar to each other, and rendering the current frame using the prefetched second graphics data.

According to an exemplary embodiment of the inventive concept, a system on chip (SoC) includes a central processing unit (CPU) for executing an application by controlling an operation of the SoC; and a graphics processing unit (GPU) for performing tile-based rendering using prefetched graphics data. The GPU includes a tiler configured to perform binning on a current frame and obtain a first binning bitstream of a first tile among a plurality of tiles of the current frame, a binning correlator configured to determine whether the first tile and a second tile of a previous frame are similar to each other by using the first binning bitstream and a second binning bitstream of the second tile, where the second tile has a same tile ID as the first tile, a prefetcher configured to prefetch second graphics data used to render the second tile by using the tile ID, when it is determined that the first tile and the second tile are similar to each other, and at least one processor configured to render the current frame by using the prefetched second graphics data.

BRIEF DESCRIPTION OF THE DRAWINGS

The above and other features of the inventive concept will be more clearly understood by describing in detail exemplary embodiments thereof with reference to the accompanying drawings.

FIG. 4 is table for explaining a process of determining similarity between tiles by using binning bitstreams, according to an exemplary embodiment of the inventive concept.

FIG. 7 illustrates a process whereby a prefetcher of FIG. 3 uses address information and size information of graphics data to track the graphics data, according to an exemplary embodiment of the inventive concept.

DETAILED DESCRIPTION OF THE EMBODIMENTS

Figure 1:
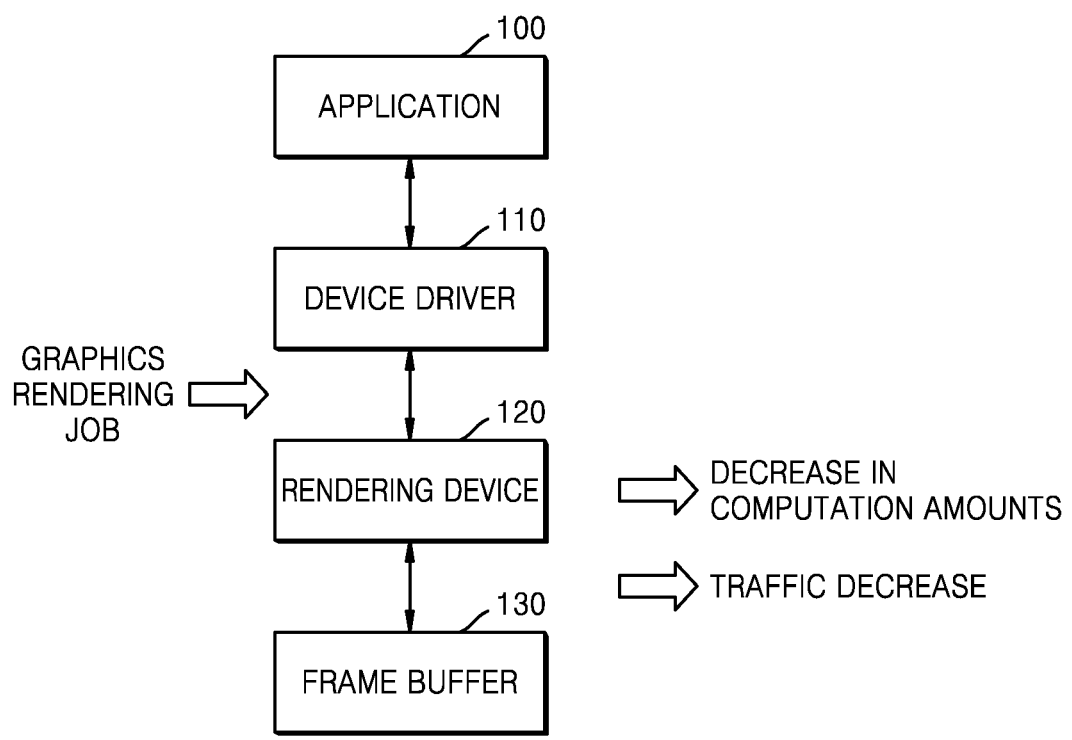
FIG. 1 is a diagram for explaining a connection relationship among devices, according to an exemplary embodiment of the inventive concept.

Exemplary embodiments of the inventive concept provide a graphics processing unit (GPU) for performing tile-based rendering using prefetched graphics data.

Additionally, exemplary embodiments of the inventive concept provide a method of improving rendering performance by performing tile-based rendering using prefetched graphics data.

Furthermore, exemplary embodiments of the inventive concept provide a system on chip (SoC) including a central processing unit (CPU) and a GPU for performing tile-based rendering using prefetched graphics data.

Hereinafter, exemplary embodiments of the inventive concept will be described in detail with reference to the accompanying drawings. Like reference numerals refer to like elements throughout this application.

FIG. 1 is a diagram for explaining a connection relationship among devices, according to an exemplary embodiment of the inventive concept.

An application 100 is a program designed to perform a certain function.

The application 100 transmits commands regarding image processing to a device driver 110. The application 100 may transmit various types of commands to the device driver 110.

The device driver 110 outputs, to a rendering device 120, graphics rendering jobs according to the commands received from the application 100.

The rendering device 120 performs graphics processing. For example, the rendering device 120 may be a graphics processing unit (GPU). For example, the rendering device 120 may be a GPU 300 of FIG. 3, a GPU 800 of FIG. 8, or a GPU 930 of FIG. 9.

The rendering device 120 generates images and outputs the generated images to the application 100, according to the graphics rendering jobs received from the device driver 110.

The rendering device 120 may perform rendering in units of tiles. A tile-based rendering method is a method of splitting a frame into multiple tiles and generating an image in units of tiles.

A frame buffer 130 stores images of frames. The frame buffer 130 is a type of memory. The frame buffer 130 stores the images generated by the rendering device 120.

The rendering device 120 according to exemplary embodiments of the inventive concept may effectively perform tile-based rendering by prefetching at least some pieces of graphics data used to render a tile of a previous frame which has the same tile ID as an arbitrary tile of a current frame, while rendering is performed on the arbitrary tile.

Figure 2:
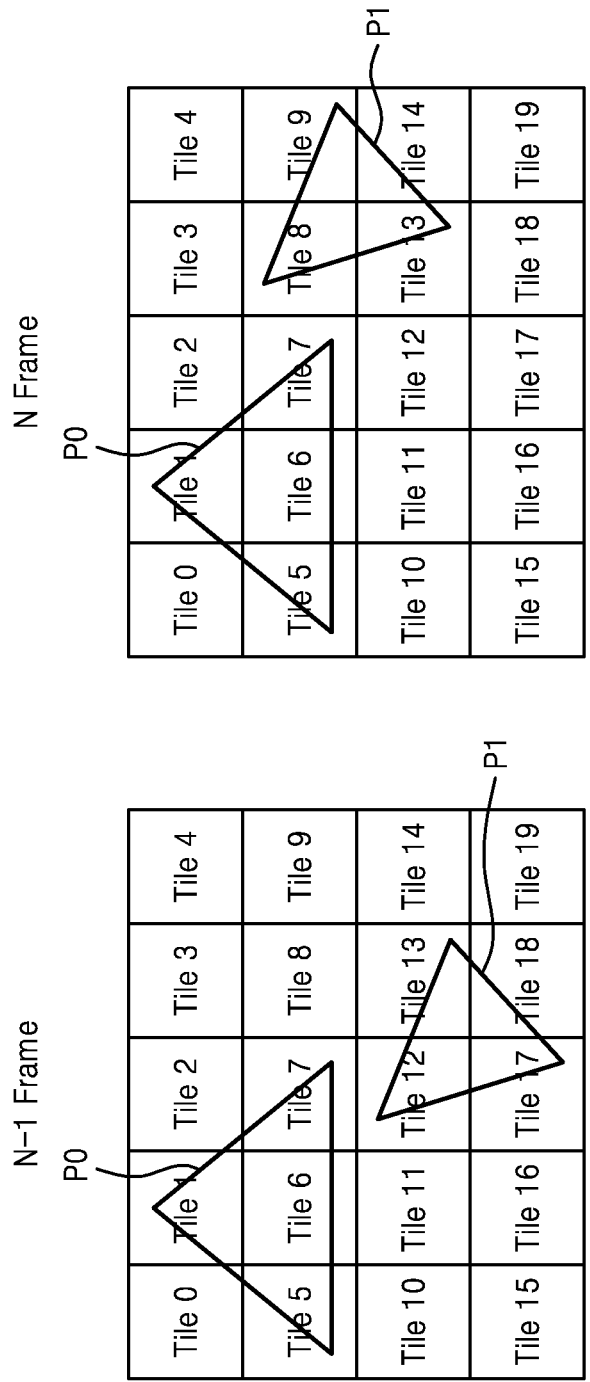
FIG. 2 is a diagram for explaining an operation of a rendering device of FIG. 1 according to an exemplary embodiment of the inventive concept.

FIG. 2 is a diagram for explaining an operation of a rendering device of FIG. 1 according to an exemplary embodiment of the inventive concept.

Referring to FIG. 2, the rendering device 120 may perform rendering on a current frame by referring to a previous frame. The current frame is referred to as an N frame and the previous frame is referred to as an N−1 frame hereinafter. Since there is a high possibility that rendering is performed on similar images or the same image in the N−1 frame and the N frame, the rendering device 120 may render the N frame by referring to the N−1 frame. For example, when there is a tile that is the same as or similar to a tile of the previous frame N−1 frame among tiles of the current frame N frame, the rendering device 120 may perform rendering on the N frame based on a result of performing rendering on the N−1 frame.

In more detail, FIG. 2 illustrates the N−1 frame and the N frame, and the N−1 frame is a frame on which rendering is completed before rendering is performed on the N frame. The N−1 frame and the N frame may each be split into 20 tiles in total. However, the number of tiles, for example, 20, is merely an example, and the N−1 frame and the N frame may each be split into an arbitrary number of tiles. Tiles having the same tile number are at the same location. For example, a Tile 7 of the N−1 frame is at the same location as a Tile 7 of the N frame. Tiles that are at the same location in different frames may have the same tile ID.

Referring to the N−1 frame, a first triangle (a primitive P0) is displayed on a Tile 0, a Tile 1, a Tile 2, a Tile 5, a Tile 6, and the Tile 7, and a second triangle (a primitive P1) is displayed on a Tile 12, a Tile 13, a Tile 17, and a Tile 18. Referring to the N frame, a first triangle (a primitive P0) is displayed on a Tile 0, a Tile 1, a Tile 2, a Tile 5, a Tile 6, and the Tile 7, and a second triangle (a primitive P1) is displayed on a Tile 8, a Tile 9, a Tile 13, and a Tile 14. Among 20 tiles of each of the N−1 frame and the N frame, identical images are displayed on the Tiles 0-7, 10, 11, 15, and 16, whereas different images are displayed on the Tiles 8, 9, 12-14, and 17-19. Similar images may be displayed on the Tiles 13 of the N−1 frame and the N frame in that the Tiles 13 include the same primitive.

The rendering device 120 may use at least some pieces of the graphics data generated while rendering is performed on a tile of the previous frame (e.g., N−1) so as to perform rendering on a tile of the current frame (e.g., N) which has the same image as or similar images to the tile of the previous frame among the tiles of the current frame. For example, the rendering device 120 may prefetch data regarding the primitive P1 among the pieces of the graphics data generated to render the Tile 13 of the N−1 frame so as to render the Tile 13 of the N frame. Therefore, although the tiles of the previous frame and the current frame are not completely the same, if the tiles are similar to each other, the rendering device 120 may prefetch at least some pieces of the graphics data used to render the tile of the previous frame, and thus the performance of rendering on the current frame may be improved.

Figure 3:
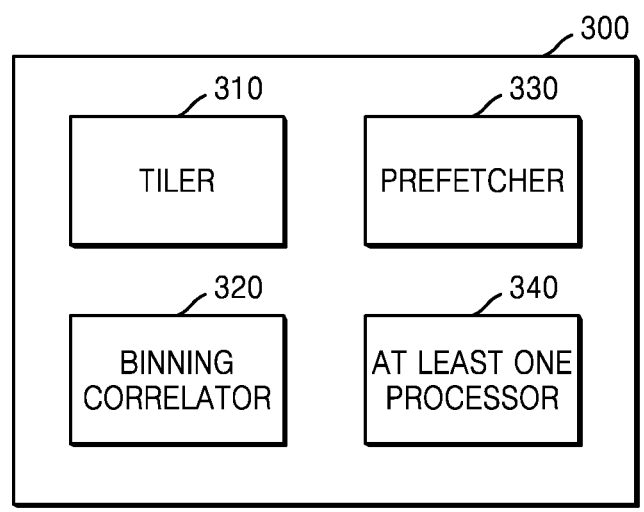
FIG. 3 is a block diagram of a graphics processing unit (GPU) according to an exemplary embodiment of the inventive concept.

FIG. 3 is a block diagram of a GPU according to an exemplary embodiment of the inventive concept.

Referring to FIG. 3, the GPU 300 may include a tiler 310, a binning correlator 320, a prefetcher 330, and at least one processor 340. FIG. 3 illustrates that the GPU 300 only includes components that are related to the present exemplary embodiment. However, the GPU 300 of FIG. 3 may further include other general-purpose components in addition to the components illustrated in FIG. 3. For example, the GPU 300 may further include a scheduler, an L1 cache, an L2 cache, or the like.

The tiler 310 may perform binning on a current frame and thus may obtain a first binning bitstream of a first tile among tiles included in the current frame. The tiler 310 may split the current frame into at least one tile and may perform binning on the at least one tile. Binning may be a process of checking a list of primitives of each tile which are to be processed. For example, the tiler 310 may assign numbers or IDs to primitives so as to distinguish the primitives included in the tile from one another. Additionally, the tiler 310 may receive primitive numbers or primitive IDs generated by the device driver 110 of FIG. 1.

The first binning bitstream obtained by performing binning on the first tile may include information about primitives included in the first tile. For example, the first binning bitstream may include information regarding which primitives are included in the first tile. The tiler 310 may store a result of binning performed on the current frame in a memory. For example, the tiler 310 may store the first binning bitstream in the memory.

The memory is a semiconductor device that reads or writes data. The memory may quickly read or write data and may be volatile memory such as Static Random Access Memory (SRAM), Dynamic Random Access Memory (DRAM), a latch, a flip-flop, or a register. However, the inventive concept is not limited thereto. For example, the memory may be non-volatile memory such as NAND Flash Memory, Vertical NAND (VNAND) Flash memory, NOR Flash Memory, Resistive Random Access Memory (RRAM), Phase-Change Memory (PRAM), Magnetoresistive Random Access Memory (MRAM), Ferroelectric Random Access Memory (FRAM), or Spin Transfer Torque Random Access Memory (STT-RAM).

The binning correlator 320 may determine whether the first tile and a second tile are similar to each other by using the first binning bitstream and a second binning bitstream of the second tile of the previous frame that has the same tile ID as the first tile. Having the same tile ID may indicate that the first tile and the second tile are at the same location in the different frames. The second binning bitstream of the second tile may be generated when binning is performed on the previous frame and may be stored in advance in the memory. The second binning bitstream may include information about primitives included in the second tile.

The binning correlator 320 may determine that the first tile and the second tile are similar to each other when a difference between a sum of bits included in the first binning bitstream and a sum of bits included in the second binning bitstream is less than or equal to a threshold value. Hereinafter, a process of determining similarity between tiles by using binning bitstreams will be described in more detail with reference to FIG. 4.

FIG. 4 is a table for explaining the process of determining similarity between tiles by using binning bitstreams, according to an exemplary embodiment of the inventive concept.

FIG. 4 illustrates a binning bitstream of tiles of each of the previous frame (e.g., the N−1 frame of FIG. 2) and the current frame (e.g., the N frame of FIG. 2), a sum of bits included in each binning bitstream, and a result of determining similarity.

Referring to the table of FIG. 4, when the tile IDs of the first tile of the N frame and the second tile of the N−1 frame are the Tile 0, and when a primitive ID of a first triangle is P0 and a primitive ID of a second triangle is P1, the first binning bitstream of the first tile is "10", and the second binning bitstream of the second tile is also "10".

Each bit included in a binning bitstream may indicate whether a primitive corresponding to each bit is included in a tile. For example, "1" may indicate that the primitive is included in the tile, and "0" may indicate that the primitive is not included in the tile. Since the first tile includes only the first triangle P0, a bit corresponding to the first triangle P0 may be "1", and a bit corresponding to the second triangle P1 may be "0".

When the difference between the sum of bits included in the first binning bitstream and the sum of bits included in the second binning bitstream is less than or equal to the threshold value, it may indicate that the first tile and the second tile include the same number of primitives or a similar number of primitives. By taking into account a high possibility that rendering is performed on similar images of the previous frame and the current frame, when the first tile and the second tile include the same number of primitives or a similar number of primitives, it may be predicted that the first tile and the second tile are similar enough to each other to ensure that at least some pieces of the graphics data used to render the second tile may be used to render the first tile.

For example, a sum of bits included in the first binning bitstream of the first tile having the tile ID of the Tile 0 in the N frame is 1+0=1, and a sum of bits included in the second binning bitstream of the second tile having the tile ID of the Tile 0 in the N−1 frame is also 1+0=1. Thus, a difference between the sum of bits included in the first binning bitstream and the sum of bits included in the second binning bitstream is 1−1=0. For example, when the threshold value is 0, since the difference between the sum of bits included in the first binning bitstream and the sum of bits included in the second binning bitstream is less than or equal to the threshold value, it may be determined that the first tile and the second tile are similar to each other. As can be seen in FIG. 2, the first tile and the second tile are tiles including the same primitive at the same location and indicating the same image.

As another example, a third binning bitstream of a third tile having a tile ID of the Tile 13 in the N frame is "01", and a fourth binning bitstream of a fourth tile having the tile ID of the Tile 13 in the N−1 frame is "01". Since a difference (1−1=0) between a sum (0+1=1) of bits included in the third binning bitstream and a sum (0+1=1) of bits included in the fourth binning bitstream is less than or equal to the threshold value, it may be determined that the third tile and the fourth tile are similar to each other. As can be seen in FIG. 2, although the third tile and the fourth tile do not indicate completely the same image, the third tile and the fourth tile include the same primitive, and thus, it is understood that the third tile and the fourth tile are similar enough to each other to ensure that at least some pieces of the graphics data used to render the fourth tile may be used to render the third tile.

According to exemplary embodiments of the inventive concept, although an image indicated by a tile included in the previous frame is not completely the same as an image indicated by a tile included in the current frame, it may be determined that the tiles of the previous frame and the current frame are similar to each other. For example, although a location of a primitive included in the tile of the current frame is slightly changed compared to the tile of the previous frame, at least some pieces of graphics data, which are used to render the tile of the previous frame, may be used to render the tile of the current frame. In this case, as the at least some pieces of the graphics data, which are used to render the tile of the previous frame, are prefetched, tile-based rendering may be effectively performed.

It is assumed that the threshold value is 0 in the example of FIG. 4, but the threshold value may be set as an arbitrary number. Additionally, FIGS. 2 and 4 illustrate that the number of primitives included in each frame is 2, but the number of primitives is not limited thereto. The number of primitives may vary according to the situation. Furthermore, a length of a binning bitstream may be adjusted as the number of primitives included in the frame differs.

Referring back to FIG. 3, in exemplary embodiments of the inventive concept, the threshold value may be determined to be a fixed value based on a result of simulating an application. In exemplary embodiments of the inventive concept, the threshold value may be dynamically adjusted based on a cache hit rate received from at least one of the L1 cache and the L2 cache included in the GPU 300. For example, when the received cache hit rate is high, the threshold value may be increased, but when the received cache hit rate is low, the threshold value may be decreased. However, the inventive concept is not limited thereto.

When it is determined that the first tile and the second tile are similar to each other, the binning correlator 320 may transmit a similarity determination result to the scheduler. The scheduler is a hardware component that schedules tile-based graphics rendering jobs in units of processing cores included in the GPU 300. When assigning a tile-based graphics rendering job to a certain processing core, the scheduler may transmit a tile ID to the prefetcher 330 included in the processing core.

The prefetcher 330 may use the tile ID to prefetch second graphics data used to render the second tile. Graphics data may include at least one of vertex attribute data, texture data, and graphics state (Gstate) data, all of which are used to render tiles.

A vertex attribute may be a location or an orientation of a vertex, coordinates or connection information of a texture, or the like. A texture may be an image that is applied to an object while a 3D object on a 3D image is rendered to be displayed as a 2D image. Such a texture may contain information about a detailed shape, texture, color, etc. of the 3D object. Graphics state may include information about attributes of a texture.

The prefetcher 330 may prefetch the second graphics data based on second address information and second size information of the second graphics data which match with the tile ID. The second address information and the second size information of the second graphics data, which are used to render the second tile while the previous frame is rendered, may match with the tile ID and may be stored in advance. The second address information may include information about at least one of a start address and a last address of a read address that is requested to the memory to read the second graphics data in the previous frame, and the second size information may be determined based on a difference between the last and start addresses.

The prefetcher 330 may include an address tracker for tracking the second address information and the second size information of the second graphics data. Hereinafter, with reference to FIGS. 5 to 7, a process whereby the prefetcher 330 tracks the second address information and the second size information of the second graphics data while the previous frame is rendered, matches the second address information and the second size information with the tile ID, and stores the same will be described in more detail.

Figure 5:
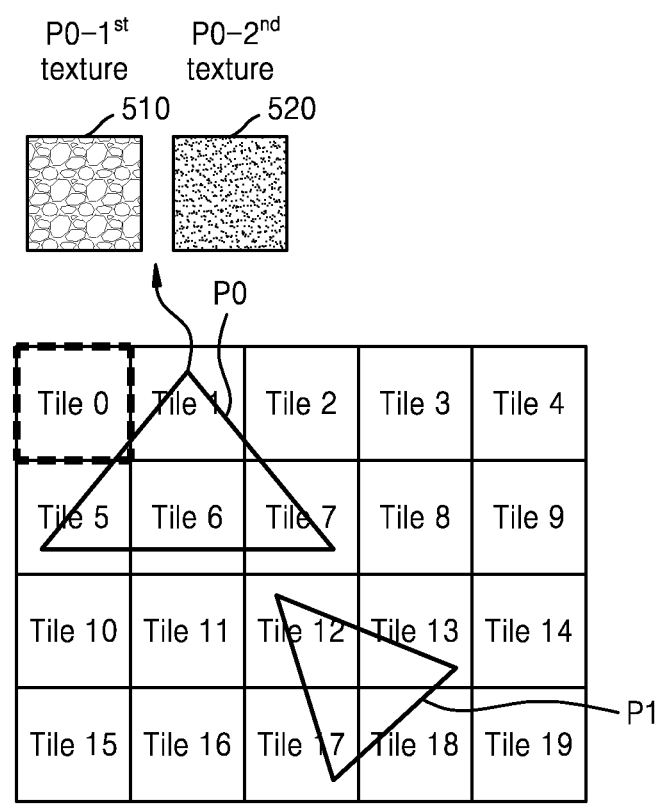
FIG. 5 illustrates an example of graphics data used to render primitives included in tiles, according to an exemplary embodiment of the inventive concept.

FIG. 5 illustrates an example of graphics data used to render primitives included in tiles, according to an exemplary embodiment of the inventive concept.

FIG. 5 illustrates an example of texture data among graphics data used to render primitives included in a certain tile, e.g., a Tile 0, of a previous frame. A tile having a tile ID of the Tile 0 includes the primitive P0 indicating a first triangle. The primitive P0 is a primitive rendered using a first texture 510 and a second texture 520. A detailed shape, texture, color, etc. of the primitive P0 may be determined by the first texture 510 and the second texture 520.

When a job regarding the tile having the tile ID of the Tile 0 is assigned to a certain processing core included in the GPU 300, the processing core may send, to a memory, a request for data of the first texture 510 and data of the second texture 520 to be used to render the primitive P0. Hereinafter, a layout of a memory in which texture data is stored will be described in more detail with reference to FIG. 6.

Figure 6:
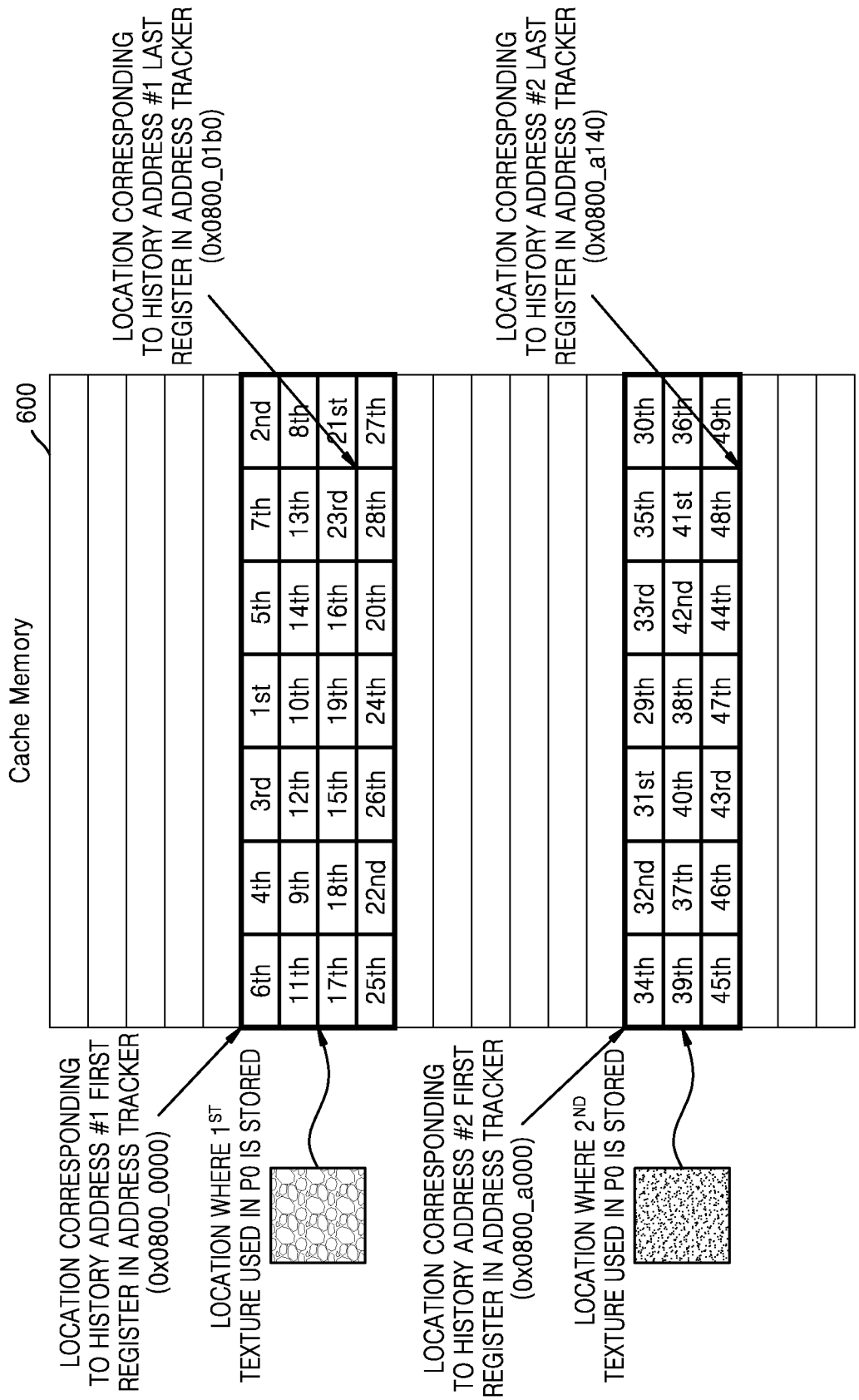
FIG. 6 illustrates a layout of a memory in which texture data is stored, according to an exemplary embodiment of the inventive concept.

FIG. 6 illustrates a layout of a memory in which texture data is stored, according to an exemplary embodiment of the inventive concept.

FIG. 6 illustrates a location, where first texture data used to render the primitive P0 is stored, and a location where second texture data used to render the primitive P1 is stored, in a cache memory 600. Referring to FIG. 6, while the processing core performs rendering on the primitive P0, read addresses corresponding to the locations where the first texture data and the second texture data are stored are randomly requested.

For example, the first texture data is stored in read addresses 0x0800_0000 to 0x0800_01b0 of the cache memory 600, but while the processing core performs rendering on the primitive P0, the read addresses 0x0800_0000 to 0x0800_01b0 are requested randomly, instead of being requested sequentially. Therefore, the location where the first texture data is stored has to be tracked to ensure that the prefetcher 330 accurately prefetches the first texture data while rendering is performed on subsequent frames. Hereinafter, a process whereby the prefetcher 330 uses address information and size information of graphics data so as to track the graphics data will be described in more detail with reference to FIG. 7.

FIG. 7 illustrates a process whereby a prefetcher of FIG. 3 uses address information and size information of graphics data to track the graphics data, according to an exemplary embodiment of the inventive concept.

The prefetcher 330 may keep updating a first address and a last address among read addresses requested to obtain the address information and the size information of the graphics data. The prefetcher 330 may update the read addresses, which are requested to the memory while a job is performed, within a range of a certain cycle or within a range of all cycles.

The prefetcher 330 may include at least one register updating each of the first address and the last address among the requested read addresses. When the job has finished, the first address and the last address among the requested read addresses may stop being updated, and a start address 710 and a last address 720 corresponding to the location where the first texture data is stored may be determined. The start address 710 may correspond to a value that a register (a History address #1 first register of FIGS. 6 and 7) updating the first address finally stores, and the last address 720 may correspond to a value that a register (a History address #1 last register of FIGS. 6 and 7) updating the last address finally stores.

Additionally, the prefetcher 330 may determine a size 730 of the first texture data based on a difference between the last address 720 and the start address 710. For example, the size 730 of the first texture data may be determined to be 0x0800_01b0-0x0800_0000=0x0000_01b0 that is a difference between 0x0800_01b0 (the last address 720) and 0x0800_0000 (the start address 710).

The prefetcher 330 may store the start address 710 and the size 730 of the first texture data, and when the first texture 510 is used while rendering is performed on the subsequent frames, the prefetcher 330 may prefetch the first texture data by using the start address 710 and the size 730 of the first texture data. For example, the prefetcher 330 may prefetch the first texture data by prefetching the read addresses from the start address 710 of the first texture data to the size 730 of the first texture data.

The first texture data may be tracked within a range of a predefined size. For example, the first texture data may be tracked within a size of 0x0000_0200. Since the graphics data is tracked within the range of the predefined size, the first texture data and the second texture data may be classified and tracked. A size range in which the graphics data is to be tracked may be set by the device driver 110 of FIG. 1 and may be stored in a register mapped to the memory within the GPU 300. However, the inventive concept is not limited thereto.

The first texture data has been described above, but the processes performed with regard to the first texture data may be similarly applied to the second texture data. Additionally, texture data among the graphics data has been described as an example, but the processes performed with regard to the texture data may be similarly applied to other types of graphics data.

Referring back to FIG. 3, the at least one processor 340 may perform rendering on a current frame by using prefetched second graphics data. The at least one processor 340 may include a graphic state manager, an input assembler, a Clip, Cull and Viewport (CCV), a rasterizer, a Color/Depth Raster Operation (C/Z ROP), a shader core, a texture unit, or the like. The graphic state manager, the input assembler, the CCV, the rasterizer, the C/Z ROP, the shader core, the texture unit, or the like may be defined according to a 3D graphics API standard such as OpenGL, OpenGL ES, or Direct 3. An operation of the at least one processor 340 will be described in more detail with reference to FIG. 8.

The prefetcher 330 may match, with the tile ID, the first address information and the first size information of the first graphics data used to render the first tile in the current frame and may store the first address information and the first size information. The first address information and the first size information of the first graphics data, which match with the tile ID and are stored, may be used to render a next frame. The descriptions that are provided with reference to FIGS. 5 to 7 may be applied to the process whereby the prefetcher 330 matches, with the tile ID, the first address information and the first size information of the first graphics data used to render the first tile in the current frame and stores the first address information and the first size information.

The tiler 310, the binning correlator 320, the prefetcher 330, and the at least one processor 340 of FIG. 3 may be implemented by one or more processors. For example, the tiler 310, the binning correlator 320, and the at least one processor 340 of FIG. 3 may be implemented as an array of multiple logic gates, or a combination of a general-purpose microprocessor and a memory storing therein a program executable by the microprocessor. For example, the prefetcher 330 may be implemented as at least one register including a storage space for storing address information and size information of graphics data.

The GPU 300 may effectively perform tile-based rendering by prefetching at least some pieces of graphics data used to render a tile of a previous frame, which has the same tile ID as an arbitrary tile of a current frame, while rendering is performed on the arbitrary tile. In detail, although the tile of the previous frame is not completely the same as the tile of the current frame, if the tile of the previous frame is similar to the tile of the current frame, the GPU 300 may prefetch the at least some pieces of the graphics data used to render the tile of the previous frame, and thus, rendering performance may be improved.

Figure 8:
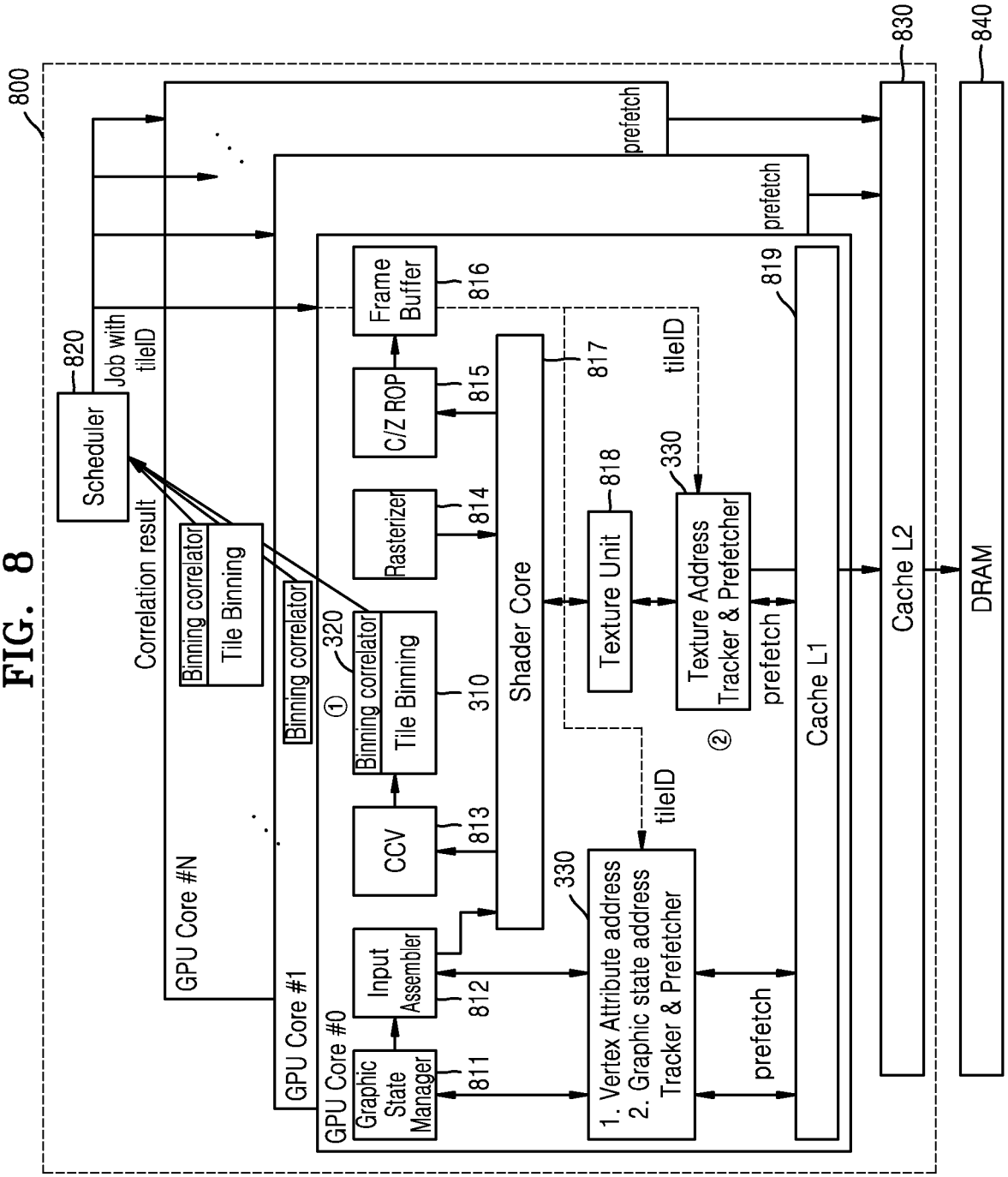
FIG. 8 is a block diagram of a system for performing tile-based rendering, according to an exemplary embodiment of the inventive concept.

FIG. 8 is a block diagram of a system for performing tile-based rendering, according to an exemplary embodiment of the inventive concept.

Referring to FIG. 8, the system for performing tile-based rendering may include a GPU 800 and a DRAM 840. The GPU 800 may include processing cores GPU Core #0 and GPU Core #1 to GPU Core # N, a scheduler 820, and an L2 cache 830. Each of the processing cores GPU Core #0 and GPU Core #1 to GPU Core # N may further include a graphic state manager 811, an input assembler 812, a CCV 813, a rasterizer 814, a C/Z ROP 815, a frame buffer 816, a shader core 817, a texture unit 818, and an L1 cache 819, in addition to the tiler 310, the binning correlator 320, and the prefetcher 330 of FIG. 3.

The graphic state manager 811, the input assembler 812, the CCV 813, the rasterizer 814, the C/Z ROP 815, the shader core 817, and the texture unit 818 of FIG. 8 may correspond to the at least one processor 340 of FIG. 3. The descriptions provided with reference to FIG. 3 will not be repeated.

The graphic state manager 811 may be a module that manages information about attributes of a texture or the like. The input assembler 812 may be a module that performs a first process of a rendering pipeline, may read data of a vertex buffer or an index buffer received from an application, and may transmit, to a next process of the rendering pipeline, data generated by combining primitives including a dot, a line, a triangle, etc.

The CCV 813 may be a module that prevents the occurrence of unnecessary rasterization and fragment shading by removing primitives that will not be displayed on a screen that is finally rendered.

The tiler 310 (tile binning of FIG. 8) may be a module that determines primitives necessary to render a certain tile by indicating, as a binning vector or a binning bitstream, which tile includes a primitive to be displayed on the screen during tile-based rendering.

The binning correlator 320 may determine whether a tile of a previous frame is similar to a tile of a current frame, based on a binning bitstream of the tile of the previous frame and the binning bitstream of the tile of the current frame. In detail, when a difference between a sum of bits included in the binning bitstream of the tile of the current frame and a sum of bits included in the binning bitstream of the tile of the previous frame is less than or equal to the threshold value, the binning correlator 320 may determine that the tile of the current frame is similar to the tile of the previous frame. When it is determined that the tile of the current frame is similar to the tile of the previous frame, the binning correlator 320 may transmit a similarity determination result to the scheduler 820.

The scheduler 820 may be a module that schedules tile-based graphics rendering jobs in units of the processing cores GPU Core #0 and GPU Core #1 to GPU Core # N included in the GPU 800. When a tile-based graphics rendering job is assigned to a certain processing core (e.g., the GPU Core #0), the scheduler 820 may transmit the tile-based graphics rendering job and a tile ID corresponding thereto to the prefetcher 330 included in the certain processing core.

The prefetcher 330 may include an address tracker that tracks address information and size information of the graphics data used to render the tile of the previous frame. The prefetcher 330 may use the tile ID to prefetch the graphics data used to render the tile of the previous frame, while rendering is performed on the tile of the current frame. The prefetcher 330 may sequentially retrieve the L1 cache 819, the L2 cache 830, and the DRAM 840 to prefetch the graphics data.

The rasterizer 814 may be a fixed function module that performs scan line conversion to convert a vector basic form such as a dot, a line, or a triangle into a raster image. Vertices of a primitive may be converted into clip spaces having the same form, due to rasterization. An output from the rasterizer 814 may be mapped to the shader core 817.

The C/Z ROP 815 may be a module that combines existing data of a buffer, in which a color, a depth, a stencil, etc. are stored, with an effect of a newly rendered pixel and stores, in the frame buffer 816, new data generated as a result of the above combination. The frame buffer 816 may be a storage unit that temporarily stores information of an image to be displayed on the screen in a raster scanning method.

The shader core 817 may be a module that determines a color value of a pixel based on information about a vertex and material attributes of the vertex. The texture unit 818 may be a module that applies a 2D image to a surface of a polygon, which is a unit of a figure or a face, and thus, 3-dimensionally displays a 3D object. The L1 cache 819 and the L2 cache 830 may each be a high-speed buffer memory between the DRAM 840 and the GPU 800.

The graphic state manager 811, the input assembler 812, the CCV 813, the rasterizer 814, the C/Z ROP 815, the shader core 817, the texture unit 818, and the scheduler 820 may be implemented as one or more processors. For example, the graphic state manager 811, the input assembler 812, the CCV 813, the rasterizer 814, the C/Z ROP 815, the shader core 817, the texture unit 818, and the scheduler 820 may be implemented as an array of logic gates, or as a combination of a general-purpose microprocessor and a memory storing therein a program executable by the microprocessor.

Figure 9:
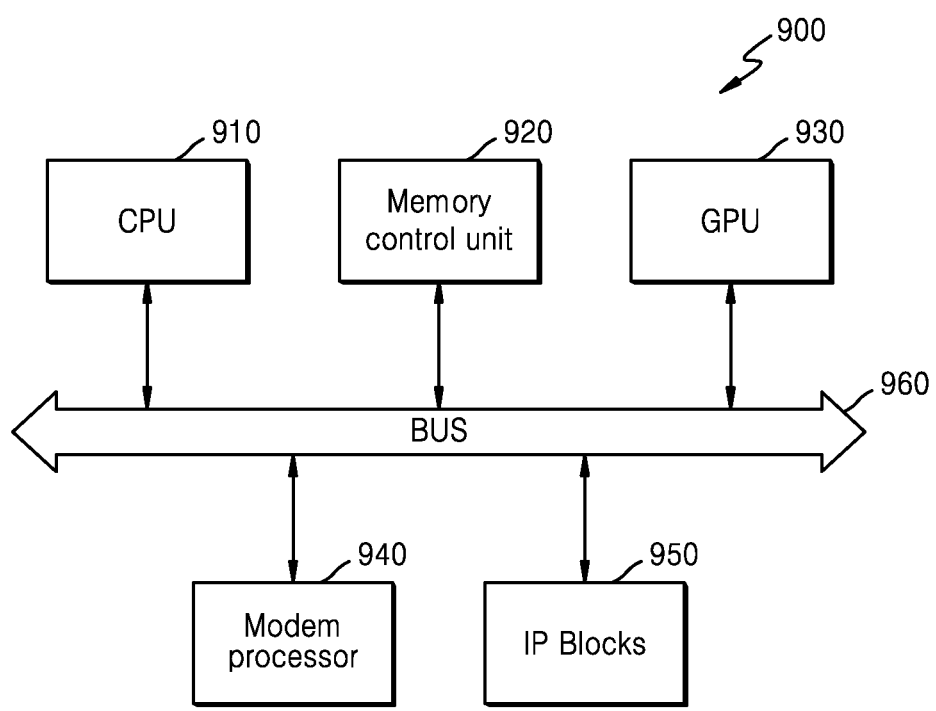
FIG. 9 is a block diagram of a system on chip (SoC) according to an exemplary embodiment of the inventive concept.

FIG. 9 is a block diagram of a system on chip (SoC) according to an exemplary embodiment of the inventive concept.

Referring to FIG. 9, an SoC 900 may include a central processing unit (CPU) 910, a memory control unit 920, the GPU 930, a modem processor 940, IP blocks 950, and a bus 960 connecting the CPU 910, the memory control unit 920, the GPU 930, the modem processor 940, and the IP blocks 950 to one another. The SoC 900 integrates a complicated system performing various functions into one chip.

For example, the SoC 900 may correspond to an application processor included in a mobile device that is a type of a rendering system. The mobile device may include the application processor and a memory.

The CPU 910 may execute an application by controlling an operation of the SoC 900. For example, the CPU 910 may control image data to be displayed to execute an application. To this end, the CPU 910 may read data from a frame buffer in which the image data is stored. The frame buffer may correspond to DRAM located outside the SoC 900, but may be embedded in the SoC 900. The GPU 930 may provide the image data to the frame buffer. The GPU 930 may be the GPU 300 of FIG. 3 or the GPU 800 of FIG. 8. The GPU 930 may perform tile-based rendering using the prefetched graphics data.

The IP blocks 950 may perform specific operations for executing the application. For example, the IP blocks 950 may perform video coding or process 3D graphics. The CPU 910 and the GPU 930 may also be referred to as IP blocks. Since the application processor may be referred to as a ModAP as the application processor performs a modem communication function, the SoC 900 may also be referred to as a ModAP as the SoC 900 also performs a modem communication function by using the modem processor 940.

Protocols having certain bus standards may be applied to the bus 960. The Advanced RISC Machine (ARM) Advanced Microcontroller Bus Architecture (AMBA) protocol may be used as a standard of the bus 960. The AMBA protocol bus may include Advanced High-Performance Bus (AHB), Advanced Peripheral Bus (APB), Advanced eXtensible Interface (AXI), AXI4, AXI Coherency Extensions (ACE), or the like. Alternatively, other types of protocols, for example, SONICs's uNetwork, IBM's CoreConnect, OCP-IP's Open Core Protocol, or the like may be used.

As described above, the SoC 900 of FIG. 9 may effectively perform tile-based rendering by prefetching at least some pieces of graphics data used to render a tile of a previous frame, which has the same tile ID as an arbitrary tile of a current frame, while rendering is performed on the arbitrary tile.

Figure 10:
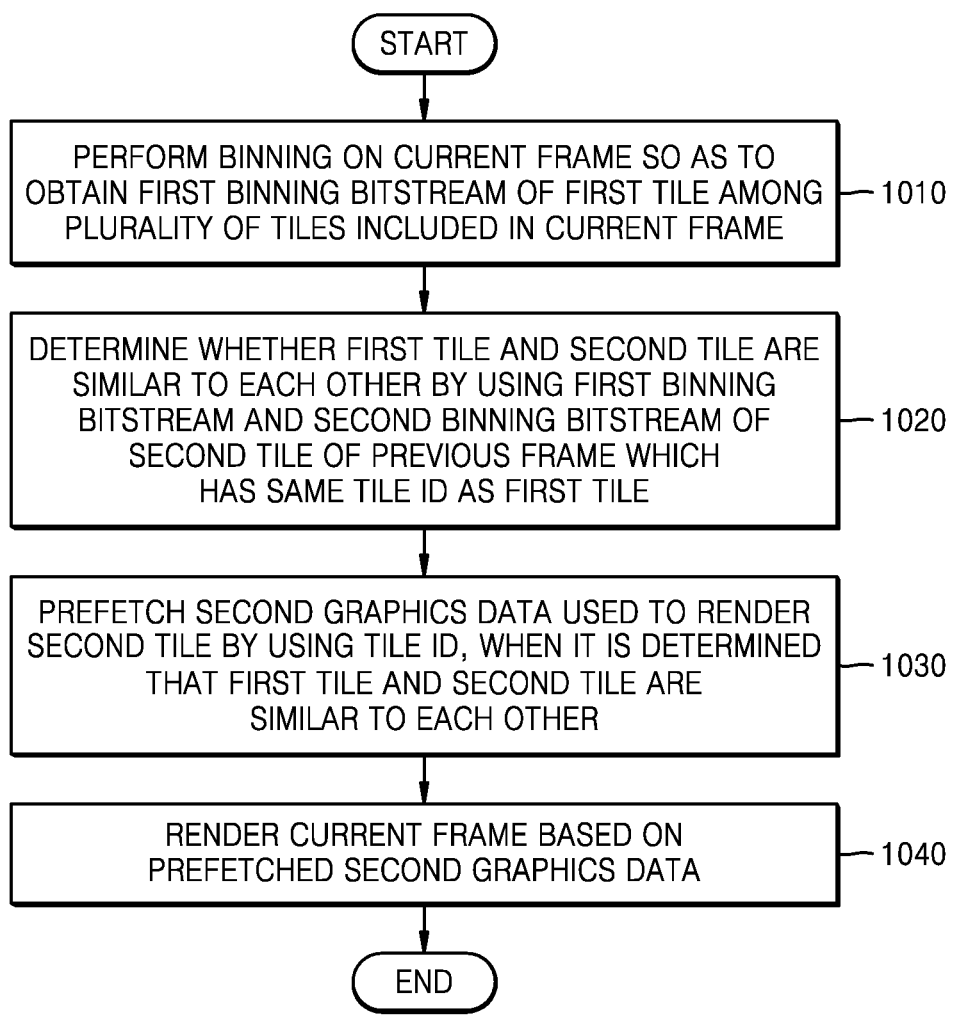
FIG. 10 is a flowchart of a method of performing tile-based rendering using prefetched graphics data, according to an exemplary embodiment of the inventive concept.

FIG. 10 is a flowchart of a method of performing tile-based rendering using prefetched graphics data, according to an exemplary embodiment of the inventive concept.

Referring to FIG. 10, the method includes operations that are time-serially performed by the GPU 300, 800, or 930 of FIG. 3, 8, or 9. Therefore, the descriptions of the GPU 300, 800, or 930, as provided with reference to FIGS. 1 to 9, may be applied to the method of FIG. 10.

In operation 1010, the GPU may perform binning on a current frame and thus may obtain a first binning bitstream of a first tile among tiles included in the current frame.

In operation 1020, the GPU may use the first binning bitstream and a second binning bitstream of a second tile of the previous frame, which has the same tile ID as the first tile, and may determine whether the first tile and the second tile are similar to each other. In detail, when a difference between a sum of bits included in the first binning bitstream and a sum of bits included in the second binning bitstream is less than or equal to a threshold value, the GPU may determine that the first tile and the second tile are similar to each other.

According to exemplary embodiments of the inventive concept, the threshold value may be determined to be a fixed value based on a result of simulating an application. According to exemplary embodiments of the inventive concept, the threshold value may be dynamically adjusted based on a cache hit rate received from at least one of an L1 cache and an L2 cache included in the GPU. Each of the first binning bitstream and the second binning bitstream may include information about primitives included in each of the first tile and the second tile.

In operation 1030, when it is determined that the first tile and the second tile are similar to each other, the GPU may use the tile ID to prefetch second graphics data used to render the second tile. The GPU may sequentially retrieve the L1 cache, the L2 cache, and DRAM so as to prefetch the second graphics data.

In detail, the GPU may use second address information and second size information of the second graphics data which match with the tile ID, thus prefetching the second graphics data. The second address information may include information about at least one of a start address and a last address of a read address requested to a memory to read the second graphics data in the previous frame, and the second size information may be determined based on a difference between the last address and the start address.

In operation 1040, the GPU may use the prefetched second graphics data to render the current frame. Since at least some pieces of the graphics data necessary to render a tile of the current frame are prefetched in advance, the performance of the GPU performing rendering on the current frame may be improved.

The GPU may match, with the tile ID, first address information and first size information of first graphics data used to render the first tile of the current frame and may store the same. The first address information and the first size information of the first graphics data, which match with the tile ID and are stored, may be used to prefetch the first graphics data while rendering is performed on a next frame including the same tile as or a similar tile to the first tile of the current frame.

The exemplary embodiments of the inventive concept may be written as computer programs and can be implemented in general-use digital computers that execute the programs using a non-transitory computer readable recording medium. Structures of data described in the exemplary embodiments of the inventive concept may be recorded in the non-transitory computer readable recording medium in various manners. Examples of the non-transitory computer readable recording medium include magnetic storage media (e.g., ROM, floppy disks, hard disks, etc.), optical recording media (e.g., CD-ROMs or DVDs), etc.

While the inventive concept has been particularly shown and described with reference to exemplary embodiments thereof, it will be understood that various changes in form and details may be made thereto without departing from the spirit and scope of the inventive concept as set forth by the following claims.

What is claimed is:

1. A graphics processing unit (GPU) configured to perform tile-based rendering using prefetched graphics data, the GPU comprising:
    a tiler circuit configured to perform binning on a current frame and obtain a first binning bitstream of a first tile among a plurality of tiles of the current frame;
    a binning correlator circuit configured to determine whether the first tile and a second tile of a previous frame are similar to each other by comparing bits of the first binning bitstream and a second binning bitstream of the second tile, wherein the second tile has a same tile ID as the first tile;
    a prefetcher circuit configured to prefetch second graphics data used to render the second tile by using the tile ID, when it is determined that the first tile and the second tile are similar to each other; and
    at least one processor configured to render the current frame using the prefetched second graphics data,
    wherein the binning correlator circuit is further configured to determine that the first tile and the second tile are similar to each other when a difference between a sum of bits comprised in the first binning bitstream and a sum of bits comprised in the second binning bitstream is less than or equal to a threshold value.

2. The GPU of claim 1, wherein the threshold value is determined to be a fixed value based on a result of simulating an application.

3. The GPU of claim 1, wherein the threshold value is dynamically adjusted using a cache hit rate received from at least one of an L1 cache and an L2 cache included in the GPU.

4. The GPU of claim 1, wherein each of the first binning bitstream and the second binning bitstream comprises information about a plurality of primitives included in each of the first tile and the second tile.

5. The GPU of claim 1, wherein the prefetcher circuit is further configured to prefetch the second graphics data using second address information and second size information of the second graphics data, and
    the second address information and the second size information are matched with the tile ID.

6. The GPU of claim 5, wherein the second address information comprises information about at least one of a start address and a last address of a read address that is requested to a memory so as to read the second graphics data in the previous frame, and
    the second size information is determined based on a difference between the start address and the last address.

7. The GPU of claim 1, wherein the prefetcher circuit is further configured to match, with the tile ID, first address information and first size information of first graphics data used to render the first tile in the current frame, and to store the first address information and the first size information.

8. The GPU of claim 7, wherein each of the first graphics data and the second graphics data comprises at least one of vertex attribute data, texture data, or graphics state data.

9. A method of performing tile-based rendering using prefetched graphics data in a graphics processing unit (GPU), the method comprising:
    performing binning on a current frame and obtaining a first binning bitstream of a first tile among a plurality of tiles of the current frame;
    determining whether the first tile and a second tile of a previous frame are similar to each other by using the first binning bitstream and a second binning bitstream of the second tile, wherein the second tile has a same tile ID as the first tile;
    prefetching second graphics data used to render the second tile by using the tile ID when it is determined that the first tile and the second tile are similar to each other; and
    rendering the current frame using the prefetched second graphics data,
    wherein the determining comprises determining that the first tile and the second tile are similar to each other when a difference between a sum of bits comprised in the first binning bitstream and a sum of bits comprised in the second binning bitstream is less than or equal to a threshold value.

10. The method of claim 9, wherein the threshold value is determined to be a fixed value based on a result of simulating an application.

11. The method of claim 9, wherein the threshold value is dynamically adjusted using a cache hit rate received from at least one of an L1 cache and an L2 cache included in the GPU.

12. The method of claim 9, wherein each of the first binning bitstream and the second binning bitstream comprises information about a plurality of primitives included in each of the first tile and the second tile.

13. The method of claim 9, wherein the prefetching comprises prefetching the second graphics data using second address information and second size information of the second graphics data, and
    the second address information and the second size information are matched with the tile ID.

14. The method of claim 13, wherein the second address information comprises information about at least one of a start address and a last address of a read address that is requested to a memory so as to read the second graphics data in the previous frame, and
    the second size information is determined based on a difference between the last address and the start address.

15. The method of claim 9, further comprising:
    matching, with the tile ID, first address information and first size information of first graphics data used to render the first tile in the current frame; and
    storing the first address information and the first size information.

16. The method of claim 15, wherein each of the first graphics data and the second graphics data comprises at least one of vertex attribute data, texture data, or graphics state data.

17. The method of claim 9, wherein the prefetching comprises sequentially retrieving an L1 cache, an L2 cache, and dynamic random access memory (DRAM) to prefetch the second graphics data.

18. A system on chip (SoC) comprising:
    a central processing unit (CPU) configured to execute an application by controlling an operation of the SoC; and
    a graphics processing unit (GPU) configured to perform tile-based rendering using prefetched graphics data, wherein the GPU comprises:
a tiler circuit configured to perform binning on a current frame and obtain a first binning bitstream of a first tile among a plurality of tiles of the current frame;
a binning correlator circuit configured to determine whether the first tile and a second tile of a previous frame are similar to each other by using the first binning bitstream, a second binning bitstream of the second tile, and a threshold value, wherein the second tile has a same tile ID as the first tile;
a prefetcher circuit configured to prefetch second graphics data used to render the second tile by using the tile ID, when it is determined that the first tile and the second tile are similar to each other; and
at least one processor configured to render the current frame by using the prefetched second graphics data,
wherein the threshold value is dynamically adjusted using a cache hit rate received from at least one of an L1 cache and an L2 cache included in the GPU.

* * * * *